1

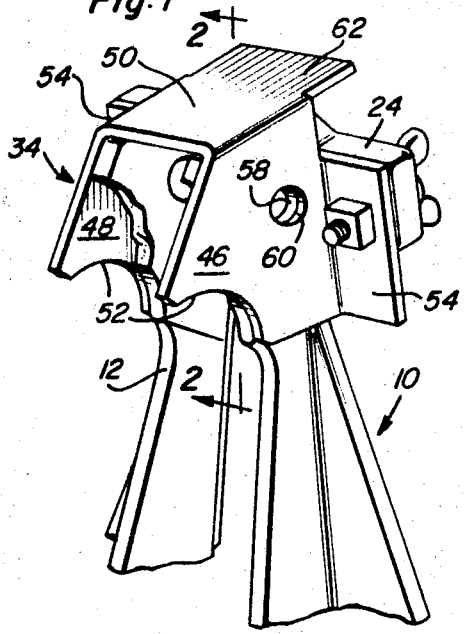
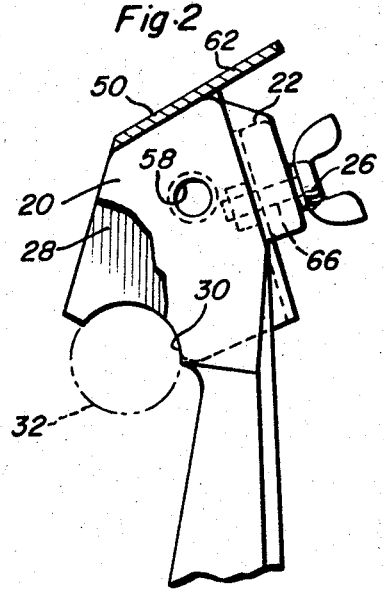
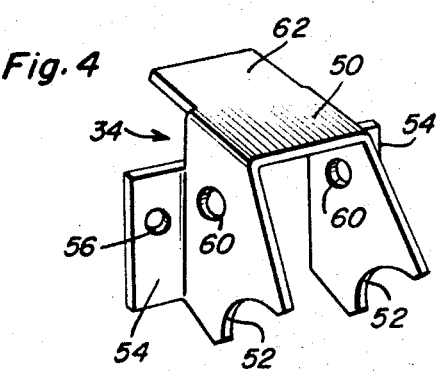
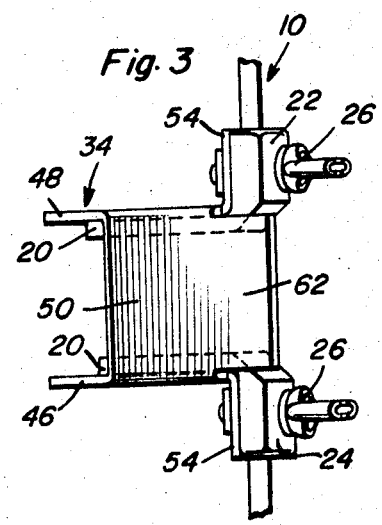
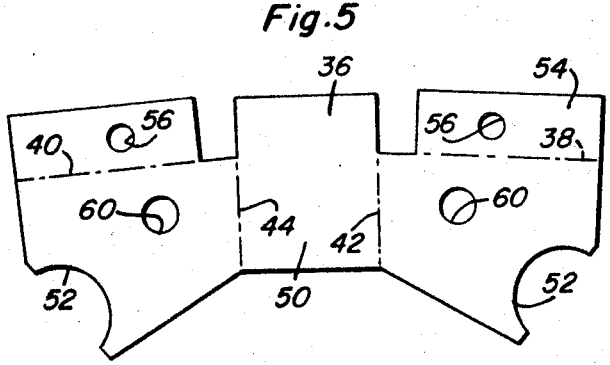
Anthony L. Griffin
David A. Griffin
INVENTORS United States Patent Office
3,462,144
Patented Aug. 19, 1969

3,462,144
REPLACEMENT FLANGE FOR PIN SPOTTER
RING TUBE GUIDE HOUSING
Anthony L. Griffin, 107 Division St., and David A. Griffin, 42 Storrie St., both of Amsterdam, N.Y. 12010
Filed Aug. 24, 1967, Ser. No. 663,143
Int. Cl. A63d 5/00
U.S. Cl. 273—43                                3 Claims

ABSTRACT OF THE DISCLOSURE

A repair or reinforcement structure for the ring tube guide housing of a centerless pin elevator wheel, the structure including a metal body configured to embrace a portion of the housing with mounting flanges of the repair structure generally coextensive with the mounting lugs of the housing, and said repair structure and housing have identically contoured ring engaging recesses.

---

The apparatus of the instant invention has been designed specifically for use on a cast aluminum housing of an A.M.F. automatic pin spotter. The aluminum housing with which the instant invention is adapted to be specifically used is designated by the manufacturers of the pin spotter by part No. 6631 and is used to guide the ring tube on the centerless pin elevator wheel of the automatic pin spotter. The housing includes two portions thereof which frequently snap and which therefore require that the housings be repaired or replaced. Replacement of the housing in the conventional manner as opposed to repair of the housing in accordance with the present invention requires two additional hours labor and $3.00 extra parts cost. If the housing could be readily replaced in a few moments time the problem presented when one of the housings breaks would not be so severe. However, when breakage of the subject housing occurs and the associated pin spotter must be shutdown for repairs for a period of time in excess of two hours, considerable monies and customer relations are lost in addition to the cost of parts and labor for repairing the housing. Of course, if a replacement housing is not available or a serviceman is not immediately available to replace such a broken housing, even greater losses are incurred by the operator of a bowling alley.

Not only is the instant invention proposed to be utilized as a means for repairing the subject housing, inasmuch as the housing is subject to frequent breakage, the instant invention may also be utilized as a preventative measure and secured to the subject housing before the latter has broken. In this manner, breakage of the housing in the usual manner is substantially eliminated and if for any reason the housing should break, it would be already repaired.

The main object of this invention is to provide a repair assemblage for the cast aluminum guide housing of an A.M.F. automatic pin spotter.

Another object of this invention is to provide a structure which may be mounted in operative repair position and utilized to prevent breakage of the associated cast aluminum housing.

Another important object of this invention is to provide a means whereby a broken cast aluminum guide housing of an automatic pin spotter may be more quickly and economically repaired.

Another object of this invention, in accordance with the immediately preceding object, is to provide a means by which the guide housing of a pin spotter may be repaired in a more permanent manner.

A final object of this invention to be specifically enumerated herein is to provide a repair structure in accordance with the preceding objects and which will conform to conventional forms of manufacture, be of simple construction and easy to install so as to provide a device that will be economically feasible, long lasting and relatively trouble-free in operation.

These together with other objects sand advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a fragmentary perspective view of a cast aluminum guide housing of a pin spotting machine and which has certain portions thereof that have been broken, the repair structure of the instant invention being operatively mounted on the guide housing as a repair component therefor;

FIGURE 2 is a fragmentary sectional view taken substantially upon the plane indicated by the section line 2—2 of FIGURE 1;

FIGURE 3 is a top plan view of the assemblage illustrated in FIGURES 1 and 2;

FIGURE 4 is a perspective view of the repair structure of the instant invention; and FIGURE 5 is a plan view of the sheet metal blank from which the repair structure of the instant invention may be readily formed by forming four right angle bends in the sheet metal blank.

Referring now more specifically to the drawings, the numeral 10 generally designates the cast aluminum guide housing with which the repair structure is to be operatively associated. The guide housing 10 is a part of an A.M.F. automatic pin spotter and is given the part No. 6631. The housing 10 includes an end portion 12 including a pair of spaced generally parallel abutment lugs 20 including corresponding edge portions 22 from which a pair of oppositely directed and outwardly projecting apertured mounting lugs 24 extend in opposite directions. The mounting lugs 24 are secured to the associated automatic pin spotting machine by means of suitable fasteners such as fasteners 26 and the abutment lugs 20 may be seen to be broken as at 28, the abutment lugs 20 originally being provided with almost full semi-circular recesses 30 for abutting engagement by shaft portions 32.

The shaft portions 32 conventionally abut the abutment lugs 20 upon seated engagement in the recesses 30 and the impact of the shaft portions 32 with the abutment lugs 20 is sometimes sufficient to cause the abutment lugs 20 to break along the lines 28.

In order to replace the broken guide housing 10, it is necessary not only to remove the fasteners 26 but to also disconnect other components of the automatic pin spotter which are conventionally attached to the end of the guide housing 10 remote from the abutment lugs 20. The total time involved for replacing one of the guide housings 10 by a skilled mechanic is somewhat in excess of two hours and this replacement involves a parts cost of somewhat more than $3.00.

The repair structure of the instant invention is referred to in general by the reference numeral 34 and may be readily formed from a blank 36 of 16 gauge steel sheet metal. The blank 16, after being cut into the desired shape, may be bent along lines 38, 40, 42 and 44 in order to form the generally U-shaped body comprising the structure 34 including a pair of spaced generally parallel flange portions 46 and 48 interconnected by means of an integral bight portion 50 extending between corresponding edge portions of the flange portions 46 and 48. The flange portions 46 and 48 include generally semi-cylindrical abutment surfaces 52 defining recesses correponding to the recesses 30 of the abutment lugs 20 and the bending of the blank 36 along lines 38 and 40 forms mounting flanges 54 which are apertured as at 56. Further, the abutment lugs 20 are provided with aligned apertures 58 and the flange portions 46 include aligned apertures 60 which are registrable with the apertures 58. In addition, the bight portion 50 includes a generally coplanar flange portion 62 projecting outwardly from one edge portion thereof.

With attention now invited more specifically to FIGURES 1–3 of the drawings it may be seen that the repair structure 34 may be secured to the end portion 12 of the guide housing 10 in a manner such that the abutment lugs 20 are embraced between the flange portions 46 and 48 and the recesses 52 are aligned with the recesses 30. Further, the mounting flanges 54 overlie the apertured mounting lugs 22 in surface to surface contacting engagement therewith with the apertures 56 in the mounting flanges 54 registered with the apertures 66 formed through the lugs 22. Thus, once the fasteners 26 have been removed, the guide housing 10 may be readily repaired, after having been broken along lines 28, by slipping the repair structure 34 over the broken abutment lugs 20 in the manner illustrated in FIGURES 1–3 of the drawings and again replacing the fasteners 26 with the latter also being secured through the apertured mounting flanges 54 of the repair structure 34.

Inasmuch as the recesses 52 precisely align with the remaining portions of the recesses 30 and correspond directly to the full recesses 30, the repaired guide structure is fully operative in its originally intended manner.

Inasmuch as the guide housings 10 are subject to frequent breakage, if it is desired the repair structure 34 may be secured to an unbroken guide housing 10 in the same manner so as to prevent that guide housing 10 from breaking.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination, a housing structure and a repair bracket therefor, said repair bracket comprising a rigid body including a pair of spaced generally parallel flange portions joined at one pair of corresponding edges by means of an integral bight portion extending therebetween, said flange portions including a second pair of corresponding edges adjacent said one pair of edges including portions thereof contoured to engage a cooperating part, and a pair of oppositely laterally directed mounting flanges carried by a third pair of corresponding edges of said parallel flanges also adjacent said first pair of edges, said housing structure having one end including a pair of spaced generally parallel abutment lugs closely adjacent and generally paralleling said spaced flanged portions, said housing structure being secured to a supporting structure by means of fasteners passing through oppositely directed apertured mounting lugs carried by said housing structure and also passed through said mounting flanges, said mounting flanges overlying said apertured mounting lugs, said abutment lugs, at least in an unbroken state, including contoured portions with which the first-mentioned contoured portions directly correspond.

2. In combination, a housing structure and a repair bracket therefor, said repair bracket comprising a rigid body including a pair of spaced generally parallel flange portions joined at one pair of corresponding edges by means of an integral bight portion extending therebetween, said flange portions including a second pair of corresponding edges adjacent said one pair of edges including portions thereof contoured to engage a cooperating part, and a pair of oppositely laterally directed mounting flanges carried by a third pair of corresponding edges of said parallel flanges also adjacent said first pair of edges, said housing structure having one end including a pair of spaced generally parallel abutment lugs closely adjacent and generally paralleling said spaced flange portions, said housing structure being secured to a supporting structure by means of fasteners passing through oppositely directed apertured mounting lugs carried by said housing structure and also passed through said mounting flanges, said mounting flanges overlying said apertured mounting lugs, said abutment lugs, at least in an unbroken state, including contoured portions with which the first-mentioned contoured portions directly correspond, said contoured portions defining recesses opening outwardly of said second edges and in a direction inclined slightly away from said one pair of edges.

3. The combination of claim 2 wherein said recesses are arcuate in configuration.

References Cited

UNITED STATES PATENTS

| 1,444,628 | 2/1923  | Miller.              |
|-----------|---------|----------------------|
| 1,592,609 | 7/1926  | Mattice _____ 29—402 X |
| 2,016,883 | 10/1935 | Barnes _____ 29—401 X |
| 2,060,720 | 11/1936 | Beauchamp ____ 248—251 X |
| 2,424,155 | 7/1947  | Emerick.             |

OTHER REFERENCES

American Machine & Foundry Co., Parts Catalog, Automatic Pinspotters, Rev. 10–59; pp. 66, 67, GV 909 A5a, 1959.

ANTON O. OECHSLE, Primary Examiner

U.S. Cl. X.R.

29—183.5, 190, 402; 248—251